United States Patent
Croce et al.

[15] 3,670,042
[45] June 13, 1972

[54] MODIFIED OXIDATIVE DEHYDROGENATION CATALYSTS

[72] Inventors: Louis J. Croce, Seabrook, Tex.; Laimonis Bajars, Princeton; Maigonis Gabliks, Highland Park, both of N.J.

[73] Assignee: Petro-Tex Chemical Corporation, Houston, Tex.

[22] Filed: Sept. 16, 1969

[21] Appl. No.: 858,543

Related U.S. Application Data

[63] Continuation-in-part of Ser. No. 459,878, May 28, 1965.

[52] U.S. Cl. ...................260/680 E, 23/DIG. 1, 252/462, 260/666 A, 260/668 D, 260/669 R, 260/673.5, 260/683.3
[51] Int. Cl. ...................................................C07c 5/18
[58] Field of Search...............................260/680 E

[56] References Cited

UNITED STATES PATENTS

| | | | |
|---|---|---|---|
| 2,461,147 | 2/1949 | Davies et al. | 260/680 |
| 3,205,179 | 9/1965 | Soderquist et al. | 260/669 X |
| 3,284,536 | 11/1966 | Bajars et al. | 260/680 X |
| 3,303,235 | 2/1967 | Croce et al. | 260/680 |
| 3,308,182 | 3/1967 | Gabliks et al. | 260/680 |
| 3,409,697 | 11/1968 | Callahan et al. | 260/680 |
| 3,450,789 | 6/1969 | Kehl et al. | 260/680 |
| 3,513,216 | 5/1970 | Woskow | 260/680 |

*Primary Examiner*—Paul M. Coughlan, Jr.
*Attorney*—G. Baxter Dunaway

[57] ABSTRACT

Oxidative dehydrogenation of organic compounds with catalyst comprising a metal ferrite with a Periodic Table Group IIIB metal or metal compound as a catalyst modifier. For example, butene is oxidatively dehydrogenated to butadiene-1,3 with a catalyst comprising manganese ferrite modified with a minor amount of cerium oxide.

23 Claims, No Drawings

MODIFIED OXIDATIVE DEHYDROGENATION CATALYSTS

CROSS REFERENCE TO RELATED APPLICATIONS

This application is a continuation-in-part of copending application Ser. No. 459,878 filed May 28, 1965 and entitled "Chemical Process."

BACKGROUND OF THE INVENTION

1. Field of the Invention

This application relates to the oxidative dehydrogenation of organic compounds.

2. Description of the Prior Art

U. S. Pat. Nos. 3,270,080; 3,284,536; 3,303,234; 3,303,235; 3,303,236; 3,303,238; 3,308,182; 3,324,195; 3,334,152; 3,342,890; 3,420,911; 3,420,912; 3,428,703; 3,440,299; and others disclose the oxidative dehydrogenation of organic compounds with catalysts comprising ferrites.

SUMMARY OF THE INVENTION

In a process for the oxidative dehydrogenation of organic compounds with ferrite catalysts other than Group IIIB ferrites, the improvement comprising utilizing an improved catalyst comprising a metal ferrite with a Periodic Table Group IIIB metal(s) or metal compound as a catalyst modifier as an additive.

DESCRIPTION OF THE PREFERRED EMBODIMENTS

One of the primary objectives in catalyst development is to produce more active catalysts which still have high selectivity. Generally higher yields per pass can be obtained by more active catalysts. However, even if the absolute yield is not increased, it is an important advantage of a more active catalyst that the process can be operated at a lower reaction temperature. It has been discovered that the process of this invention may be operated at lower dehydrogenation temperatures using the catalysts of this invention. There are distinct disadvantages in operating the dehydrogenation process at excessively high temperatures, and at certain temperatures the process becomes uneconomical. For one thing, the mechanical stresses in the reactors are more pronounced at higher temperatures and consequently it is necessary to compensate for these stresses in the construction of the reactor. At high temperatures there is a problem of embrittlement of the reactor materials. Another advantage resulting from operating at lower temperatures is that the problem of quenching of the reaction gases is alleviated when operating at these lower temperatures and quenching can either be reduced or in some instances entirely eliminated. By avoiding quenching or by reducing the amount of quench water, there is less steam generated due to quenching and correspondingly there is less steam to be condensed downstream. Still another advantage of operating at a lower temperature is that thermal cracking reactions are less pronounced. There is also the advantage that a shorter reactor bed can be utilized, particularly when a predominately or essentially adiabatic reactor is employed.

Other advantages of this invention are possible, e.g. high selectivities and conversions are obtained. Also, it is possible to obtain a higher percentage utilization of oxygen for the dehydrogenation reaction and to obtain high conversions and selectivities at relatively low ratios of oxygen to organic compound. Still another feature of this process is that it is not necessary to use excessive ratios of steam to organic compound to produce a given yield.

The process of this invention may be applied to the dehydrogenation of a wide variety of organic compounds. Such compounds normally will contain from two to 20 carbon atoms, at least one

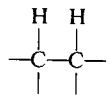

grouping, a boiling point below about 350° C., and such compounds may contain other elements, in addition to carbon and hydrogen such as oxygen, halogens, nitrogen and sulphur. Preferred are compounds having from two to 12 carbon atoms, and especially preferred are compounds of three to six or eight carbon atoms.

Among the types of organic compounds which may be dehydrogenated by means of the process of this invention are nitriles, amines, alkyl halides, ethers, esters, aldehydes, ketones, alcohols, acids, alkyl aromatic compounds, alkyl heterocyclic compounds, cycloalkanes, alkanes, alkenes, and the like. Illustration of dehydrogenations include propionitrile to acrylonitrile, propionaldehyde to acrolein, ethyl chloride to vinyl chloride, methyl isobutyrate to methyl methacrylate, 2 or 3 chlorobutene-1 or 2,3 dichlorobutane to chloroprene, ethyl pyridine to vinyl pyridine, ethylbenzene to styrene, isopropylbenzene to α-methyl styrene, ethylcyclohexane to styrene, cyclohexane to benzene, methane to ethylene and acetylene, ethane to ethylene to acetylene, propane to propylene or methyl acetylene, allene, or benzene, isobutane to isobutylene, n-butane to butene and butadiene-1,3, butene to butadiene-1,3 and vinyl acetylene, methyl butene to isoprene, cyclopentane to cyclopentene and cyclopentadiene-1,3, n-octane to ethyl benzene and ortho-xylene, monomethylheptanes to xylenes, propane to propylene to benzene, ethyl acetate to vinyl acetate, 2,4,4-trimethylpentane to xylenes, and the like. This invention may be useful for the formation of new carbon to carbon bonds by the removal of hydrogen atoms such as the formation of a carbocyclic compound from two aliphatic hydrocarbon compounds or the formation of a dicyclic compound from a monocyclic compound having an acyclic group such the conversion of propene to diallyl. Representative materials which are dehydrogenated by the novel process of this invention include ethyl toluene, alkyl chlorobenzenes, ethyl naphthalene, isobutyronitrile, propyl chloride, isobutyl chloride, ethyl fluoride, ethyl bromide, n-pentyl iodide, ethyl dichloride, 1, 3 dichlorobutane, 1, 4 dichlorobutane, the chlorofluoroethanes, methyl pentane, methylethyl ketone, diethyl ketone, n-butyl alcohol, methyl propionate, and the like.

Suitable dehydrogenation reactions are the following: acyclic compounds having four to five non-quarternary contiguous carbon atoms to the corresponding olefins, diolefins or acetylenes having the same number of carbon atoms; aliphatic hydrocarbons having six to 16 carbon atoms and at least one quarternary carbon atom to aromatic compounds, such as 2,4,4-trimethylpentene-1 to a mixture of xylenes; acyclic compounds having six to 16 carbon atoms and no quarternary carbon atoms to aromatic compounds such as n-hexane or the n-hexenes to benzene; cycloparaffins and cycloolefins having five to eight carbon atoms to the corresponding olefin, diolefin or aromatic compound, e.g., cyclohexane to cyclohexene or cyclohexadiene or benzene; aromatic compounds having eight to 12 carbon atoms including one or two alkyl side chains of two or three carbon atoms to the corresponding aromatic with unsaturated side chain such as ethyl benzene to styrene.

The preferred compounds to be dehydrogenated are hydrocarbons with a particularly preferred class being acyclic non-quarternary hydrocarbons having four to five contiguous carbon atoms or ethyl benzene and the preferred products are n-butene-1 or 2, butadiene-1,3, vinyl acetylene, 2 methyl-1-butene, 3-methyl-1-butene, 3-methyl-2-butene, isoprene, styrene or mixtures thereof. Especially preferred as feed are n-butene-1 or 2 and the methyl butenes and mixtures thereof such as hydrocarbon mixtures containing these compounds in at least 50 mol percent.

The organic compound to be dehydrogenated is contacted with oxygen in order for the oxygen to oxidatively dehydrogenate the compound. The oxygen may be supplied to the organic compound from any suitable source as by feeding oxygen to a dehydrogenation zone for example as disclosed in U.S. Pat. No. 3,207,810 issued Sept. 21, 1965. Oxygen may be fed to the reactor as pure oxygen, as air, as oxygen-enriched air, oxygen mixed with diluents, ans so forth. Oxygen may also be supplied by means of a transport or moving oxidant type of process such as disclosed in U. S. Pat. No. 3,050,572 issued Aug. 21, 1962 or U. S. Pat. No. 3,118,007 issued Jan. 14, 1964 in which case the catalysts of this invention can partially or completely furnish the oxygen and therefore the catalysts could be referred to as an oxidant or oxygen carrier. Oxygen may be supplied partially by a solid oxidant and partially by gaseous oxygen. Oxygen may also be added in increments to the dehydrogenation zone. Oxygen may also be supplied by the release of oxygen from oxygen releasing compounds which are in gas phase in the dehydrogenation zone. Although determinations regarding the mechanism of reaction are difficult, the process of this invention is an oxidative dehydrogenation process wherein the predominant mechanism of dehydrogenation is by the reaction of oxygen with hydrogen and preferably at least 85 or 90 mol percent of the hydrogen atoms removed are by this reaction.

The amount of oxygen employed may vary depending upon the desired result such as conversion, selectivity and the number of hydrogen atoms being removed. Thus, to dehydrogenate butane to butene requires less oxygen than if the reaction proceeds to produce butadiene. Normally oxygen will be supplied (including all sources, e.g. air to the reactor or solid oxidant to the reactor) in the dehydrogenation zone in an amount from about 0.2 to 1.5, preferably 0.3 to 1.2, mols per mol of $H_2$ being liberated from the organic compound. Ordinarily the mols of oxygen supplied will be in the range of from 0.2 to 2.0 mols per mol of organic compound to be dehydrogenated and for most dehydrogenations this will be within the range of 0.25 to 1.5 mols of oxygen per mol of organic compound.

Preferably, the reaction mixture contains a quantity of steam or diluent such as nitrogen with the range generally being between about 2 and 40 mols of steam per mol of organic compound to be dehydrogenated. Preferably, steam will be present in an amount from about 3 to 35 mols per mol of organic compound to be dehydrogenated and excellent results have been obtained within the range of about 5 to about 30 mols of steam per mol of organic compound to be dehydrogenated. The functions of the steam are several-fold, and the steam may not merely act as a diluent. Diluents generally may be used in the same quantities as specified for the steam. These gases serve also to reduce the partial pressure of the organic compound.

It is one of the advantages of this invention that halogen may also be present in the reaction gases to give excellent results. The presence of halogen in the dehydrogenation zone is particularly effective when the compound to be dehydrogenated is saturated, such as a saturated hydrocarbon. The halogen present in the dehydrogenation zone may be either elemental halogen or any compound of halogen which would liberate halogen under the conditions of reaction. Suitable sources of halogen are such as hydrogen iodide, hydrogen bromide and hydrogen chloride; aliphatic halides, such as ethyl iodide, methyl bromide, methyl chloride, 1,2 - dibromo ethane, ethyl bromide, amyl bromide, and allyl bromide; cycloaliphatic halides, such as cyclohexylbromide; aromatic halides, such as benzyl bromide; halohydrins, such as ethylene bromohydrin; halogen substituted aliphatic acids, such as bromoacetic acid; ammonium iodide; ammonium bromide; ammonium chloride; organic amine halide salts, such as methyl amine hydrobromide; metal halides including molten halides; and the like. The halogen may be liberated partially or entirely by a solid source as disclosed in the process of U.S. Pat. No. 3,130,241 issued Apr. 21, 1964. Mixtures of various sources of halogen may be used. The preferred sources of halogen are iodine, bromine, and chlorine, and compounds thereof, such as hydrogen bromide, hydrogen iodide, hydrogen chloride, ammonium bromide, ammonium iodide, ammonium chloride, alkyl halides of one to six carbon atoms and mixtures thereof. When terms such as halogen liberating materials or halogen materials are used in the specification and claims, this includes any source of halogen such as elemental halogens, hydrogen halides, or ammonium halides. The amount of halogen, calculated as elemental halogen, may be as little as about 0.0001 or less mol of halogen per mol of the organic compound to be dehydrogenated to as high as 0.2 or 0.5. The preferred range is up to 0.09 mol of halogen per mol of the organic compound to be dehydrogenated.

The temperature for the dehydrogenation reaction generally will be at least about 250° C., such as greater than about 300° or 375° C., and the maximum temperature in the reactor may be about 700° or 800° C. or perhaps higher such as 900° C. under certain circumstances. However, excellent results are obtained within the range of or about 350° C. to 700° C., such as from or about 400° to about 675° C. The temperatures are measured at the maximum temperature in the dehydrogenation zone. An advantage of this invention is that lower temperatures of dehydrogenation may be utilized than are possible in conventional dehydrogenation processes. Another advantage is that large quantities of heat to not have to be added to the reaction.

The gaseous reactants may be conducted through the reaction chamber at a fairly wide range of flow rates. The optimum flow rate will be dependent upon such variables as the temperature of reaction, pressure, particle size, and whether a fluid bed or fixed bed reactor is utilized. Desirable flow rates may be established by one skilled in the art. Generally the flow rates will be within the range of about 0.10 to 25 liquid volumes of the organic compound to be dehydrogenated per volume of dehydrogenation zone containing catalyst per hour (referred to as LHSV). Usually, the LHSV will be between 0.15 and about 5 or 10. For calculation, the volume of a fixed bed dehydrogenation zone containing catalyst is that original void volume of reactor space containing catalyst. When a solid oxidant is employed, the dehydrogenation zone is calculated from the point of contact of the compound to be dehydrogenated to the entrance to the separator to separate oxidant from dehydrogenated compound. The gaseous hourly space velocity (GHSV) is the volume of the organic compound to be dehydrogenated in the form of vapor calculated under standard conditions of 0° C. and 760 mm. of mercury per volume of reactor space containing catalyst per hour. Generally, the GHSV will be between about 25 and 6,400, and excellent results have been obtained between about 38 and 3,800. Suitable contact times in the dehydrogenation zone are, for example, from about 0.001 or higher to about 4 or 10 or 25 seconds, with particularly good results being obtained between 0.01 and 2 or 5 seconds. The contact time is the calculated dwell time of the reaction mixture in the dehydrogenation zone, assuming the mols of product mixture are equivalent to the mols of feed mixture.

The dehydrogenation reaction may be carried out at atmospheric pressure, superatmospheric pressure or at sub-atmospheric pressure. The total pressure of the system will normally be about or in excess of atmospheric pressure, although sub-atmospheric pressure may also desirably be used. Generally, the total pressure will be between about 4 p.s.i.a. and about 100 or 125 p.s.i.a. Preferably, the total pressure will be less than about 75 p.s.i.a. and excellent results are obtained at about atmospheric pressure.

Catalyst binding agents or fillers not mentioned herein may also be used, but these will not ordinarily exceed about 50 percent or 75 percent by weight of the catalytic surface, and the described catalytic compositions will preferably constitute the main active constituent. These other binding agents and fillers will preferably be essentially inert. Preferred catalysts are those that have as a catalytic surface exposed to the reaction gases at least 25 or preferably 50 weight percent of the defined catalytic surface. The catalytic surface may be introduced as such or it may be deposited on a carrier by methods known in the art such as by preparing an aqueous solution or dispersion of a catalytic material and mixing the carrier with the solution or dispersion until the active ingredients are coated on the carrier. If a carrier is utilized, very useful carriers are silicon carbide, aluminum oxide, pumice, and the like. Other known catalyst carriers may be employed. When carriers are used, the amount of catalyst on the carrier will suitably be between about 5 to 75 weight percent of the total weight of the active catalytic material pulse carrier. Another method for introducing the required surface is to utilize as a reactor a small diameter tube wherein the tube wall is catalytic or is coated with catalytic material. Other methods may be utilized to introduce the catalytic surface such as by the use of rods, wires, mesh, or shreds, and the like, of catalytic material. The catalytic surface described is the surface which is exposed in the dehydrogenation zone to the reaction gases, that is, e.g. if a catalyst carrier is used, the composition described as a catalyst refers to the composition of the surface and not to the total composition of the surface coating plus carrier.

The catalyst compositions of this invention may also comprise additives. Phosphorus, silicon or mixtures thereof are examples of additives. For instance, phosphorus and/or silicon may suitably be present in an amount of from about 0.1 to 30 weight percent, preferably 0.2 to 20 percent, based on the total weight of the defined metal atoms of the catalyst. These ingredients may contribute e.g. to the stability of the compositions. The silicon, phosphorus or other additives may be added at various stages of the preparation of the composition, or may be added to the already formed catalyst. Any suitable compounds may be employed such as phosphoric acid, phosphorus pentoxide, ethyl phosphate, ammonium phosphate, silicon halides, etc.

The catalyst composition may be reduced with a reducing gas, e.g. prior to use in the process of dehydrogenation. Examples of reducing gases are hydrogen or hydrocarbon and illustrations of reducing are disclosed e.g. in U.S. Pat. No. 3,284,536.

The catalysts to be modified with a Group III B metal(s) or metal compound(s) (for convenience referred to as the modifier) according to this invention will comprise ferrites of the empirical formula $Me_xFe_yO_z$ with Me being defined as a metal(s), other than a Group IIIB metal, capable of forming a ferrite. The Periodic Table referred to throughout this application is the conventional Periodic Table such as is found on page 881, International Encyclopedia of Chemical Science, Van Nostrand, Princeton, N. J. 1964. In the formula, x will preferably be present, e.g. within the range of about 0.1 to 2 inclusive and y can be within the range of about 0.3 to 12 or 13 inclusive and z will vary depending on the number of oxygen vacancies but will usually be within the range of about 3 to 18 or 19 inclusive and preferably will be 4.

A preferred type of catalyst of this type is that having a face-centered cubic form of crystalline structure. Examples of this type of catalyst are ferrites of the general formula $MeO \cdot Fe_2O_3$ where Me is a divalent metal(s) cation such as $Mg^{++}$ or $Ni^{++}$. However, if the cations are large, such as $Sr^{++}$ (1.35 Angstrom), the spinel structure may not occur and other types of ferrites having a hexagonal crystal of the type $SrO \cdot 6Fe_2O_3$ may be formed. These hexagonal ferrites are within the scope of the definition of catalysts of this invention.

Suitable catalysts may also be ferrites wherein other metals are partially substituted for the iron. For example, atoms having a valence of +3 may be partially substituted for some of the $Fe^{+++}$ atoms. Also, metal atoms having a valence of +4 may replace some of the $Fe^{+++}$ ions. However, the catalysts will still suitably have iron present in an amount described above in relation to the total atoms of the second metallic ingredient(s).

The catalysts may have the iron combined in crystalline structure with oxygen and more than one other metallic element, as mentioned above. For example, a preferred type of ferrite is that essentially or approximately of the formula, $MeFe_2O_4$, where Me represents a divalent metal ion(s) with an ionic radius approximately between 0.5 and 1.1 Angstrom, preferably between about 0.6 and 1.0 Angstrom. In the case of simple ferrites, Me may be, e.g., one of the divalent ions of the transition elements as Mg, Ca, Sr, Ba, Mn, Co, Ni, Zn or Cd. However, a combination of these ions is also possible to form a ferrite such as $Ni_{0.25}Mg_{0.75}Fe_2O_4$. Therefore, for this type of ferrite the symbol Me may represent a combination of ions which have an average valency of about two. However, it is essential that the crystalline structure contain iron and the metallic element other than iron.

Examples of catalysts are such as magnesium ferrite, cobalt ferrite, nickel ferrite, zinc ferrite, barium ferrite, strontium ferrite, manganese ferrite, calcium ferrite, cadmium ferrite, silver ferrite, zirconium ferrite, or mixtures of ferrites, such as ferrites containing iron combined with at least one element selected from the group consisting of Mg, Zn, Ni, Co, Mn, Cu, Cd, Ca, Ba, Sr, Al, Cr, Ti, V, Mo, W, Na, Li, K, Sn, Pb, Sb, Bi, Ga and mixtures thereof, with a preferred group being Mg, Ca, Sr, Ba, Mn, Cr, Co, Ni, Zn and Cd. Examples of mixed ferrites are magnesium ferrite plus zinc ferrite, magnesium ferrite plus nickel ferrite, magnesium ferrite plus cobalt ferrite, magnesium ferrite plus nickel ferrite plus zinc ferrite, magnesium ferrite plus manganese ferrite. As explained above, these ferrites may be physical mixtures of the ferrites or may contain crystals wherein the different metallic atoms are contained in the same crystal or a combination of physical mixtures and chemical combinations. An example of a chemical combination would be magnesium zinc ferrite or magnesium chromium ferrite.

The valency of the metals in the catalysts do not have to be any particular values, although certain combinations are preferred or disclosed elsewhere. The determination of the valency of the ions is sometimes difficult and the results are uncertain. The different ions may exist in more than one valency state. However, a preferred catalyst is one which has the iron predominately in the $Fe^{+++}$ state. Some ferrites are described in Ferromagnetism, By Richard M. Bozorth (D. Van Nostrand Co., Inc., 1951), which disclosure is hereby incorporated by reference.

Although the catalysts may be broadly defined as containing crystalline structures of iron, oxygen and the second metallic ingredient(s), certain types of catalysts are preferred. Valuable catalysts were produced comprising as the main active constituent in the catalyst surface exposed to the reaction gases, iron, oxygen and at least one element from Group IIA, IIb, Mn, or VIII of the Periodic Table such as those selected from the group consisting of magnesium, manganese, calcium, chromium, cadmium, cobalt, zinc, nickel, barium, strontium, and mixtures thereof. Preferred catalysts have iron present as the predominant metal in the catalyst exposed in the reaction gases.

The preferred compositions exhibit a certain type of X-ray diffraction pattern. The preferred compositions do not have a sharp X-ray diffraction reflection peaks as would be found, e.g., in a high crystalline material having the same chemical composition. Instead, the preferred compositions of this invention exhibit reflection peaks which are relatively broad. The degree of sharpness of the reflection peak may be measured by the reflection peak band width at half height (W h/2). In other words, the width of the reflection peak as measured at one-half of the distance to the top of the peak is the "band width at half height." The band width at half height is measured in units of °2 theta. Techniques for measuring the band widths are discussed, e.g., in Chapter 9 of Klug and Alexander, X-ray Diffraction Procedures, John Wiley and Son, N.Y., 1954. The observed band widths at half height of the preferred compositions of this invention are at least 0.16 °2 theta and normally will be at least 0.20°2 theta.* (*The powder diffraction patterns may be made, e.g., with a Norelco constant potential diffraction unit type No. 12215/0 equipped with a wide range goniometer type No. 42273/0, cobalt tube type No. 32119, proportional counter type No. 57250/1; all coupled to the Norelco circuit panel type No. 12206/53. The cobalt K alpha radiation is supplied by operating the tube at a constant potential of 30 kilovolts and a current of 10 milliamperes. An iron filter is used to remove K beta radiation. The detector voltage is 1,660 volts and the pulse height analyzer is set to accept pulses with amplitudes between 10 and 30 volts only. Slits used are divergence 1°, receiving 0.006 inches and scatter 1°. Strip chart recordings for identification are made with a scanning speed of ¼° per minute, time constant of 4 seconds and a full scale at $10^3$ counts per second. No correction is made for K αdoublet or instrumental broadening of the band widths). For instance, excellent compositions have been made with band widths at half height of at least 0.22 or 0.23 °2 theta. The particular reflection peak used to measure the band width at one-half height is the reflection peak having Miller (hkl) indices of 220. (See, e.g., Chapter of Klug and Alexander, ibid). Applicants do not wish to be limited to any theory of the invention in regard to the relationship between composition activity and band width.

Suitable preferred ferrites according to this invention are zinc ferrites having X-ray diffraction peaks within the d-spacings 4.83 to 4.89, 2.95 to 3.01, 2.51 to 2.57, 2.40 to 2.46, 2.08 to 2.14, 1.69 to 1.75, 1.59 to 1.65 and 1.46 to 1.52, with the most intense peak being between 2.95 to 3.01; manganese ferrite having peaks at d-spacings within or about 4.87 to 4.93, 2.97 to 3.03, 2.50 to 2.58, 2.09 to 2.15, 1.70 to 1.76, 1.61 to 1.67 and 1.47 to 1.53, (with other peaks) with the most intense peak being between 2.52 to 2.58; magnesium ferrites having peaks between 4.80 to 4.86, 2.93 to 2.99, 2.49 to 2.55, 2.06 to 2.12, 1.68 to 1.73, 1.58 to 1.63 and 1.45 to 1.50 with the most intense peak being between 2.49 and 2.55; and nickel ferrites having peaks within the d-spacings of 4.97 to 4.85, 2.92 to 2.98, 2.48 to 2.54, 2.05 to 2.11, 1.57 to 1.63 and 1.44 to 1.49, with the most intense peak being within 2.48 to 2.54. The preferred manganese ferrites are those having the Mn predominantly present as a valence of plus 2. The preferred catalyst to be modified according to this invention is magnesium ferrite.

Ferrite formation may be accomplished by reacting an active compound of iron with an active compound of the designated metals. By active compound is meant a compound which is reactive under the conditions to form the ferrite. Starting compounds of iron or the other metal may be such as the nitrates, hydroxides, hydrates, oxalates, carbonates, acetates, formates, halides, oxides, etc. The starting compounds are suitably oxides or compounds which will decompose to oxides during the formation of the ferrite such as organic and inorganic salts or hydroxides. For example, manganese carbonate may be reacted with iron oxide hydrates to form manganese ferrite. Salts of the desired metals may be coprecipitated such as disclosed in U. S. Pat. No. 3,450,787 and the precipitate heated to form the ferrite. Desired ferrites may be obtained by conducting the reaction to form the ferrite at relatively low temperatures, that is, at temperatures lower than some of the very high temperatures used for the formation of some of the semi-conductor applications. Good results, e.g., have been obtained by heating the ingredients to a temperature high enough to produce the required ferrite but at conditions no more severe than equivalent to heating 950° or 1,000° C. for 90 minutes in air and generally the maximum temperature will be less than 1,300° C. and preferably less than 1,150° C. Methods for preparing catalysts to be modified according to this invention are disclosed in U. S. Pat. Nos. 3,270,080; 3,284,536; 3,303,234-5; 3,303,238; 3,308,182; 3,334,152; 3,342,890 and 3,450,787 and these disclosures are hereby incorporated by reference. The catalysts may contain unreacted precursors of the ferrite such as the oxides of Me or iron.

The catalyst modifier may be added to the catalyst at any stage of catalyst preparation. Generally the modifier will be added at such time that there will be intimate mixing with the other ingredients. The modifier may be added prior to or during ferrite formation in which case the modifying element(s) may or may not become a part of the crystalline structure. However, it has been discovered that excellent catalysts are prepared when the modifier is added to the catalyst after ferrite formation has begun or after ferrite has been formed and this is a preferred embodiment of the invention.

The amount of modifier may be varied but best results have been obtained when the total weight or modifier atoms is present in a minor amount by weight in relation to the total weight of other metals in the catalyst composition or in most cases, a minor amount of the total weight of atoms of the modifying element(s) based on the weight of atoms of iron. Preferably, the total weight of the modifying element(s) will be from at least 0.0001 atom per total atoms of the other metals in the catalytic composition and generally this will not be greater than 0.5 total atom of modifier per total atom of other metals in the catalyst composition. However, preferably the modifier will be present in an amount of from 0.0005 to 0.1 or 0.2 total atom per atom of the other metals in the catalyst composition. On a weight basis of modifier compound, calculated as the oxide for convenience only, a preferred embodiment of this invention is the use of no greater than 10 weight percent of the modifier oxide based on the total weight of the metal ferrite and uncombined iron oxide and excellent results have been obtained at 5 weight percent or less with a particularly preferred embodiment being 2 weight percent or less. Suitable ranges are such as from 0.01 to 2 or 5 weight percent modifier calculated as the oxide based on the total weight of metal ferrite and any uncombined iron oxide.

A great variety of metals or metal compounds of Group IIIB, may be used as the modifier. Metals of the described modifier in elemental forms may be employed and are included within the scope of this invention. The metals generally are changed to inorganic compounds thereof, at least on the surface under the reaction conditions set forth herein. Particularly effective are inorganic compounds such as the oxides and salts including the phosphates and the halides, such as the iodides, bromides, chlorides and fluorides. Inorganic compounds which are useful as the second component in the compounded contact mass for the process of this invention include scandium bromide, lanthanum oxide, yttrium oxide, cerium bromide, ceric oxide, ceric chloride, cerium phosphate, thorium dioxide, or uranium dioxide, and mixtures thereof. Particularly useful are mixed or pure rare earth chlorides, oxides and hydrates such as Lindsay ceric oxides Code 210B (e.g. 90 % $CeO_2$, 4% other rare earths, 1 % $P_2O_5$, 1.0 % $SiO_2$, and other minor ingredients); Lindsay ceric oxide Code 217 (e.g., 99.9 % cerium oxide); didymium chlorides, hydrates, nitrates or oxides (e.g., 45–56% $La_2O_3$, 1–2% $CeO_2$, 9–10% $Pr_6O_{11}$, 33–33% $Nd_2O_3$, 5–6% $Sm_2O_3$, 3–4% $Gd_2O_3$, 0.4 % $Y_2O_3$, and 1–2% other rare earth oxides). Preferably the catalyst will be solid under the conditions of reaction. Excellent catalysts are those comprising atoms of cerium, thorium and uranium, such as the oxides, phosphates, iodides, bromides, chlorides or fluorides of these elements. As the modifier the rare earth compounds, such as the oxides or halides are preferred. Many of the salts, oxides and hydroxides of the metals may change during the preparation of the catalyst, during heating in a reactor prior to use in the process of this invention, or are converted to another form under the described reaction conditions, but such materials still function as an effective compound in the defined process. For example, many f the metal nitrates, nitrites, carbonates, hydroxides, acetates, and the like, may be converted to the corresponding oxide or chloride under the reaction conditions defined herein. Salts which are stable or partially stable at the defined reaction temperatures are likewise effective under the conditions of the described reaction, as well as such compounds which are converted to another form in the reactor. At any rate, the catalysts are effective if the defined catalysts are present in a catalytic amount in contact with the reaction gases. Useful catalyst combinations include cerium oxide or other cerium compound and any of magnesium ferrite, manganese ferrite, zinc ferrite, nickel ferrite, cobalt ferrite, barium ferrite, magnesium chromium ferrite; didymium oxide or rare earth oxides or halides with the same ferrites; lanthanum oxide or thorium oxide with the same ferrites and so forth. Preferred catalysts are such as magnesium ferrite or manganese ferrite modified with less than 5 weight percent of cerium compound such as the oxide, halide or phosphate.

EXAMPLE 1

As a control run a magnesium ferrite catalyst is prepared from yellow iron oxide, ferric oxide, and reagent grade magnesium oxide in a 50-50 percent molar ratio. The ingredients are stirred in distilled water in a Waring blender, filtered, mixed with a small amount of magnesium chloride solution to catalyize ferrite formation and dried at 105° C. for 16 hours. The mixture is calcined in a muffle furnace for one hour at 900° C. The calcined material is crushed, and material passing No. 4 but retained on No. 10 screen (U.S. Standard Series) is used for catalyst evaluation.

Butene-2is dehydrogenated to butadiene-1,3 in a fixed bed jacketed reactor. Steam and oxygen (fed as air) are added in ratios of 0.75 and 30 mols respectively per mol butene-2. The flow rate of butene-2 is 1.0 liquid hourly space velocity (LHSV). At a reactor temperature of 425° C. the mol percent conversion is 59, the selectivity is 95 and the yield is 56 mol percent butadiene-1,3.

EXAMPLE 2

Example 1 is repeated with the exception that 10 mol percent $CeO_2$ is substituted for 10 mol percent of the magnesium oxide in the initial water slurry. Under the same reaction conditions the mol percent conversion is 65, the selectivity is 95 and the yield is 62 mol percent butadiene-1,3.

EXAMPLE 3

The catalyst is magnesium ferrite containing 10 percent by weight cerium phosphate. The catalyst to be modified is a Columbian Carbon Company magnesium ferrite type EG-1. Cerium phosphate, $CePO_4$, is added in an amount of 10 percent by weight of the magnesium ferrite. The ingredients are intimately mixed in an aqueous slurry and coated on an alumina support. Butene-2 is dehydrogenated to butadiene-1,3 in a fixed bed reactor by feeding a molar-ratio of 0.55 mols of oxygen (fed as air) and 20 mols of steam per mol of butene-2. The butene-2 flow rate is 1.5 LHSV. The catalyst is not reduced with a reducing gas prior to use. After 48 hours on steam, the conversion is 61 mol percent and the selectivity is 92 mol percent. The catalyst achieves these results at the relatively low inlet temperature of 350° C. and the maximum temperature of 460° C.

EXAMPLE 4

As a control a catalyst is prepared containing magnesium ferrite modified with 3 percent by weight of phosphoric acid. The magnesium ferrite is Columbian Carbon type EG-1. In a fixed reactor, butene-2 is dehydrogenated to butadiene-1,3. Oxygen (as air) is fed at a ratio of 0.50 mols and steam is fed at a ratio of 20 mols per mol of butene-2. The flow rate is 1.5 LHSV. The inlet temperature is 385° C. and the maximum temperature is 560° C. to give a conversion of 64 mol percent, a selectivity of 94 percent and a yield of 60 mol percent.

EXAMPLE 5

Example 4 is repeated with the exception that 0.1 weight percent cerium is added to the catalyst. The catalyst is evaluated under the same conditions as for Example 4. The inlet temperature is reduced to about 365° C. and the maximum temperature is reduced to about 540° C. Under these conditions the conversion is 66, the selectivity is 96 and the yield is 63 mol percent.

EXAMPLE 6

As a control run for Example 7 a run is made for the oxidative dehydrogenation process employing oxygen and chlorine in the feed. The catalyst is a magnesium ferrite catalyst with the magnesium ferrite being Columbian Carbon type EG 1. Butene-2 is dehydrogenated to butadiene-1,3at a flow rate of 1.5 LHSV, a steam ratio of 20 mols and an oxygen ratio of 0.60 mols per mol of butene. Chlorine is fed at a rate of 200 ppm based on the butene. The maximum selectivity and yield are obtained at a maximum temperature of about 565° C.

EXAMPLE 7

Example 6 is repeated with the exception that the catalyst contains 0.1 percent by weight cerium (calculated as elemental cerium). The cerium compound was added as an intimate mixture to the performed magnesium ferrite catalyst. The temperature at which the maximum yield is obtained is reduced to 540° C.

EXAMPLE 8

The invention is illustrated wherein the catalyst is used in a moving bed process as described in U.S. Pat. No. 3,440,299. The catalyst is a magnesium ferrite catalyst modified with a minor amount of cerium. Butene-2 is dehydrogenated to butadiene by the process described in U. S. Pat. No. 3,440,299. After 600 hours on stream butadiene-1,3 is produced at a yield of 65 mol percent per pass.

EXAMPLE 9

Isoprene is produced by reacting a mixture of 75 mol percent isoamylenes and 25 mol percent isopentane. Example 2 is repeated with the exception that the isoamylene-isopentane is fed instead of butene-2 and the reactor temperatures are adjusted to give the maximum yield of isoprene.

EXAMPLE 10

Example 2 is repeated with the exception that the feed is a 50 mol percent n-butene-2 and 50 mol percent n-butane and additionally 0.02 mol of $NH_4Br$ is added per mol of hydrocarbon mixture. A mixture of butene and butadiene is produced.

EXAMPLE 11

The catalyst is barium ferrite run as a control for Example 12. n-Butane is dehydrogenated to a mixture of n-butene and butadiene-1,3. The flow rate is 0.25 LHSV. Chlorine, oxygen and nitrogen are fed at ratios of 0.3, 1.3 and 15.0 per mol of butane. A fixed bed reactor is employed. At 600° C. 38.5 mol percent butadiene-1,3 is produced together with n-butene. The ratio of butadiene to n-butene produced is 1.14.

EXAMPLE 12

Example 11 is repeated with the exception that the barium ferrite catalyst is modified with a minor weight percent $CeO_2$. At 600° C. the yield of butadiene rose to 41.4 mol percent and the ratio of butadiene to n-butane is increased to 2.05.

EXAMPLES 13 to 18

Isoprene is formed by the oxidative dehydrogenation of isoamylene employing a manganese ferrite catalyst. Manganese ferrite may be formed by methods such as those disclosed in U. S. Pat. No. 3,420,912 issued Jan. 7, 1969. The standard test for Examples 13 to 18 is to use 70.7 grams of manganese ferrite stabilized with about 2 grams of $H_3PO_4$ and with 0.0371 mols of the particular modifier being added to the preferred ferrite. The isoamylene mixture being dehydrogenated is a mixture of 88 mol percent 2 methyl butene-2 and 8 mol percent 2 methyl butene-1. A fixed bed reactor is used with a flow rate of 1.5 LHSV and with 0.9 mol oxygen (as air) and 30 mols of steam per mol of the hydrocarbon charge. The results are as follows:

| Example | Modifier | Approx. Max. Temp. °C | Selectivity to Isoprene, % |
|---|---|---|---|
| 13 | $Nd_2O_3$ | 368 | 87 |
| 14 | $UO_2$ | 368 | 91 |
| 15 | $Y_2O_3$ | 438 | 85 |
| 16 | $La_2O_3$ | 360 | 90 |

| 17 | ThO$_2$ | 441 | 95 |
| 18 | CeO$_2$ | 446 | 93 |

EXAMPLES 19 to 22

The following runs are made to further illustrate the invention. In each case the ferrite is preformed and the additive is added in an amount of one weight percent based on the ferrite. The dehydrogenation is in a fixed bed reaction with an LHSV of 0.5 and with 0.75 mol of oxygen and 30 mols of steam per mol of organic compound being dehydrogenated. The halogen where fed is expressed as mols per mol of organic compound being dehydrogenated.

| Ex. | Ferrite | Modifier | Halogen | Organic Feed | Product |
|---|---|---|---|---|---|
| 19 | zinc ferrite | S.African Monazite ore | — | Ethyl benzene | Styrene |
| 20 | cobalt ferrite | Didymium chloride | .03 NH$_4$Br | n-propane | Propylene |
| 21 | 50% cadmium ferrite 50% strontium ferrite | La$_2$O$_3$ | .03 NH$_4$Cl | 2,3 dichlorobutane | Chloroprene |
| 22 | nickel ferrite | Scandium Oxide | | Propionitrile | Acrylonitrile |

The invention as claimed is:

1. A process for the oxidative dehydrogenation of hydrocarbons having at least four carbon atoms which comprises contacting said hydrocarbon with a metal ferrite catalyst wherein the metal of said ferrite is selected from the group consisting of magnesium, barium, manganese, zinc, cobalt, cadmium, strontium, nickel and mixtures thereof, the improvement comprising modifying the said metal ferrite catalyst with a Periodic Table Group IIIB element in an amount calculated as Group IIIB oxide of no greater than 10 weight percent based on the total weight of said metal ferrite and any uncombined iron oxide in the said catalyst.

2. The process of claim 1 wherein the metals in the said metal ferrite other than iron are present in a total amount of from 0.05 to 2.0 atoms per atom of iron.

3. The process of claim 1 wherein the crystalline structure of said catalyst is of the face-centered cubic form.

4. The process of claim 1 wherein the crystalline structure has been formed at a temperature of less than 1,150° C.

5. The process of claim 1 wherein the said hydrocarbon is selected from the group consisting of n-butane, n-butene, pentane, pentene and mixtures thereof.

6. The process of claim 1 wherein the said hydrocarbon is normal butene.

7. The process of claim 1 wherein the process also contains a halogen selected from the group consisting of iodine, bromine, chlorine and mixtures thereof in an amount up to 0.09 mol of halogen per mol of hydrocarbon.

8. The process of claim 1 wherein the ratio of said oxygen to said hydrocarbon is from 0.2 to 2.5 mols of oxygen per mol of hydrocarbon and the said temperature of dehydrogenation is from 375° to 750° C.

9. The process of claim 1 wherein the catalyst is manganese ferrite.

10. The process of claim 1 wherein the catalyst is a magnesium ferrite.

11. The process of claim 1 wherein the catalyst is zinc ferrite.

12. The process of claim 1 wherein the Group IIIB modifier is added to the catalyst after the metal ferrite has been formed.

13. The process of claim 1 wherein the total weight of Group IIIB metal elements are present in an amount of from 0.01 to 2 weight percent calculated as the oxide based on the total weight of metal ferrite and uncombined iron oxide.

14. The process of claim 1 wherein the Group IIIB element is cerium.

15. The process of claim 1 wherein the Group IIIB elements are present as rare earth oxides or halides.

16. The process of claim 1 wherein the Group IIIB element is present as cerium oxide or a cerium salt.

17. A process for the oxidative dehydrogenation of n-butene to butadiene with a catalyst comprising a ferrite selected from the group consisting of magnesium ferrite and manganese ferrite modified with from about 0.01 to 2 weight percent cerium oxide based on the weight of the said ferrite and any uncombined iron oxide, the said cerium oxide having been added to the said ferrite after the ferrite has been formed.

18. A process for the oxidative dehydrogenation of acyclic non-quarternary hydrocarbons having four to five contiguous carbon atoms which comprises contacting said hydrocarbon with a metal ferrite catalyst comprising a member selected from the group consisting of magnesium ferrite, barium ferrite and manganese ferrite, the improvement comprising modifying the said metal ferrite catalyst with a Periodic Table Group IIIB element in an amount calculated as Group IIIB oxide of no greater than 10 weight percent based on the total weight of said metal ferrite and any uncombined iron oxide in the said catalyst.

19. A process for the oxidative dehydrogenation of acyclic non-quarternary hydrocarbon having four to five contiguous carbon atoms which comprises contacting said hydrocarbon with a metal ferrite catalyst comprising a member selected from the group consisting of magnesium ferrite, barium ferrite and manganese ferrite, the improvement comprising modifying the said metal ferrite catalyst with cerium in an amount calculated as cerium oxide of no greater than 10 weight percent based on the total weight of said metal ferrite and any uncombined iron oxide in the said catalyst.

20. The process of claim 19 wherein the said metal ferrite catalyst is magnesium ferrite.

21. The process of claim 19 wherein the said metal ferrite catalyst is manganese ferrite.

22. The process of claim 19 wherein the said cerium is added to the catalyst after the said metal ferrite has been formed.

23. The process of claim 19 wherein the said hydrocarbon is selected from the group consisting of n-butene and methyl butene.

* * * * *

PO-1050
(5/69)

UNITED STATES PATENT OFFICE
CERTIFICATE OF CORRECTION

Patent No. 3,670,042                     Dated  June 13, 1972

Inventor(s)   Louis J. Croce et al

It is certified that error appears in the above-identified patent and that said Letters Patent are hereby corrected as shown below:

Col. 2, line 75 reads "ans" but should read --- and ---.
Col. 5, line 4 reads "pulse" but should read --- plus ---.
Col. 6, line 49 reads "a" but should read ---as ---.
Col. 7, line 27 reads "4.97 to" but should read --- 4.79 to ---.
Col. 8, line 59 reads "many f the" but should read --- many of the ---.
Col. 10, line 53 reads "n-butane" but should read --- n-butene ---.
Col. 10, line 60 reads "70.7" but should read --- 70.3 ---.

Signed and sealed this 2nd day of January 1973.

(SEAL)
Attest:

EDWARD M. FLETCHER, JR.
Attesting Officer

ROBERT GOTTSCHALK
Commissioner of Patents